(12) United States Patent
Lamberts et al.

(10) Patent No.: US 6,313,964 B1
(45) Date of Patent: Nov. 6, 2001

(54) EARLY WRITE ENABLE WITH OFF-TRACK WRITE PROTECTION

(75) Inventors: Bernd Lamberts, Cupertino; Mantle Yu, San Jose, both of CA (US)

(73) Assignee: International Business Machines, Armonk, NY (US)

( * ) Notice: Subject to any disclaimer, the term of this patent is extended or adjusted under 35 U.S.C. 154(b) by 0 days.

(21) Appl. No.: 09/159,820

(22) Filed: Sep. 23, 1998

(51) Int. Cl.$^7$ .............................. G11B 21/02; G11B 5/596
(52) U.S. Cl. ...................... 360/75; 360/77.08; 360/78.09
(58) Field of Search .......................... 360/49, 75, 78.14, 360/78.09, 78.04, 60, 77.08

(56) References Cited

U.S. PATENT DOCUMENTS 5,646,797  7/1997  Kadlec et al. ........................ 360/75

OTHER PUBLICATIONS

"Single Dual Purpose Shock Sensor And Actuator Latch For A Direct Access Storage Device," *IBM® Technical Disclosure Bulletin*, vol. 40, No. 12, Dec. 1997, pp. 155–159.

"Method To Predict Data Head Mis–Registration In Recording Devices With Dedicated Servo Surface," *IBM® Technical Disclosure Bulletin*, vol. 35, No. 1A, Jun. 1992, pp. 269–271.

"Optimal Means For Generating A Write Inhibit In Hard Drives In Response To External Shock Using Accelerometers," *IBM® Technical Disclosure Bulletin*, vol. 39, No. 10 Oct. 1996, p. 131.

Primary Examiner—Regina Y. Neal
(74) Attorney, Agent, or Firm—Justin F. Boyce; Robert O Guillot; Oppenheimer Wolff & Donnelly LLP

(57) ABSTRACT

In a disk drive system, a servo controller is operative to perform a process of inhibiting write operations for writing data to tracks of a disk during a head settling period following a track seek operation. During each of a first plurality of sampling intervals transpiring during a first time period, the servo controller determines a present position value indicative of the position of the head during the present sampling interval, and also determines a predicted position value indicative of the position of the head during a subsequent sampling interval. Also during each of the first plurality of sampling intervals, the servo controller determines: whether the present position value is within a first error margin from the center of a target track; and whether the predicted position value is within the first error margin. If the present position value and the predicted position value are both within the first error margin, the servo controller enables write operations. During each of a second plurality of the sampling intervals transpiring during a second time period, the servo controller determines a predicted position value indicative of the position of the head during a subsequent sampling interval. Also during each of the second plurality of sampling intervals, the servo controller determines whether the predicted position value is within a second error margin from the center of the target track. If the predicted position value is not within the second error margin, the servo controller inhibits write operations.

19 Claims, 5 Drawing Sheets

EARLY WRITE ENABLE WITH OFF-TRACK WRITE PROTECTION

BACKGROUND OF THE INVENTION

1. Field of the Invention

The present invention relates to track seeking operations in a disk drive. More particularly, the present invention relates to a method of determining when to inhibit and when to enable write operations during a head settling period following an actuator seek operation in a disk drive.

2. Description of the Prior Art

Disk drive systems typically include: a disk having a thin magnetic coating upon which user data and position information is stored in the form of flux transitions disposed in a series of concentric tracks; a spindle assembly, having a spindle motor and an associated driver circuit, for supporting and rotating the disk in response to a spindle command signal; a read/write head for detecting the flux transitions in the magnetic material as the disk is rotated relative to the head, and for generating an analog read-back signal carrying data and position information in response thereto; a head-arm assembly for supporting and moving the head radially over the surface of the disk; and an actuator assembly, usually comprising a voice coil motor and an associated driver circuit, for driving the head-arm assembly in response to an actuator command signal in order to position the head relative to the tracks of the disk. Modern drive systems also include a servo system for controlling the position of the read/write head relative to the tracks of the disk. Components of the servo system typically include: a position error channel for receiving the read-back signal provided by the head via an arm electronics unit, and operative to demodulate and decode the read-back signal to generate a position error sensing (PES) signal; and a servo controller unit responsive to the PES signal, and operative to provide the actuator command signal and the spindle command signal to the actuator assembly and spindle assembly respectively.

In digital servo control systems, position information is sampled at discrete times. Modern servo controllers, which may be implemented by a microprocessor or a digital signal processor, use state estimators to determine position, velocity, and acceleration parameters of the head as the head is moved radially over the disk by the actuator and head/arm assembly.

A dedicated servo method is commonly used with multiple disk systems in which a servo head of a single dedicated servo disk surface controls movement of corresponding data read/write heads of a multiple platter disk drive. The entire surface of one side of the dedicated servo disk is pre-recorded with servo track information. The position of the servo head relative to the dedicated disk surface is used to indicate the position of the multiple data read/write heads relative to their corresponding disk surfaces. In a sector servo system, the tracks of the disk surface are divided into radial sectors having a short servo track information area followed by a data area. The servo track information area typically includes a sector marker, track identification data, and a servo burst pattern. The sector marker indicates that servo information immediately follows in the track. In both the dedicated servo and sector servo types of systems, a PES signal is used to generate a corrective input signal that is applied to the read/write head positioning servo.

Servo track information usually includes: a synchronization field, such as for automatic gain control (AGC) or similar signal detecting purposes; a track identification field (TID field) typically comprising a digitally encoded gray code; a PES pattern field generally containing a servo pattern burst; and a customer data identification field generally including an identification synchronization pattern, identification data, and customer data.

The PES field provides for generation of the PES signal as the head reads the PES field. The PES signal typically consists of three or four staggered bursts of transitions, (e.g., A, B, C and D bursts). The PES signal, which is proportional to the relative difference of the positions of the center of the servo head and the nearest track center, is a corrective signal providing an indication of which direction the head should be moved to during either track seeking or track following operations. The measured amplitude of the bursts indicates whether or not the head is in position.

A servo system operates in several modes generally including a track following mode and a seek mode. In the track following mode, the servo controller maintains the head in a path over the centerline of a selected track to facilitate accurate reading and recording of data in the track. In the seek mode, the servo controller is directed to place the head on a target track different from the present track. A seek operation includes an acceleration sequence, and a deceleration sequence followed by a head settling period. As further explained below, during the head settling period, the head may overshoot the center of the target track and then oscillate about the center of the track before settling.

The effect of servo surface irregularities or defects in the PES signal and hence on servo system performance can be severe. Large track misregistration contributions, excessive noise leading to unreliable operation, and non-optimal seek performance are the most significant effects. In order to improve linearity, and reduce sensitivity to disk surface effects, most position channels employ a quadrature technique, and some use a servo head twice as wide as the desired data track spacing. The essence of a quadrature system is the two-position error signals, often called normal and quadrature, are demodulated. The signals are derived from two sets of patterns which, when demodulated, produce position error signals that are in space (X direction) quadrature to each other. Having two signals allows use of only the most linear part of each. The normal and quadrature position error signals are quadrature signals because they are cyclic and out of phase by ninety degrees (one quarter phase).

Track misregistration has two related aspects. Write-to-read track misregistration is the misregistration, for whatever cause, between the centerline of a recorded track and that of the read-back head following a seek to a desired record. Write-to-write track misregistration is the misregistration between a recorded track and an adjacent track, resulting in track encroachment or track-to-track squeeze depending on the direction of the misregistration on the adjacent recorded track. Among the physical factors that can result in track misregistration of both types are thermal track shift, incomplete head settling following a track seek, apparent run-out of the head/track combination due to spindle bearing and arm vibration of frequencies outside the capabilities of the servo system, and errors in the servo position detection circuits. The present application is principally concerned with reduction of track misregistration caused by incomplete head settling following a track seek.

FIG. 1 shows a graph at 10 illustrating sampled values 12 of an exemplary position error signal 14 plotted against a time axis 16 during sampling intervals, having a period T, concurrent with a head settling period following a track seek operation of a typical prior art servo system. The sampled values of the PES signal are typically binary values including X bits. The depicted graph also includes: a center value 18 indicative of the center of the target track to which the head is settling; a positive error limit 20; and a negative error limit 22. The positive and negative error limits, forming an error margin, are used in a prior art process of inhibiting write operations during track seeking. In accordance with typical prior art method, write operations are inhibited during track seeking and track settling until a specified number, X, of consecutive sampled PES values 12 of the position error signal 14 are determined to be within the specified error margin 20, 22 from the center value 18 indicating that the read/write head is within a specified distance from the center of the target track. Prior art methods typically require X=4 or 5 consecutive sampled PES values to be within the specified error margins before enabling write operations.

In the depicted example, a first sampled PES value 12, sampled at time $t_0$, is greater than the positive error limit 20. However, the next fifteen PES values, sampled at times $t_1$–$t_{15}$, are within the error margin 20, 22. Therefore, assuming that the servo system enables write operations after X=4 consecutive sampled PES values are within the specified error margin, the prior art servo system enables write operations at time $t_4$ for the depicted PES signal 14. However, in the depicted example, it is actually safe to begin write operations at $t_1$ because the next 14 sampled PES values, sampled at time $t_1$–$t_{14}$, are all within the specified error margin. Assuming a sampling period of 100 μsec, the delay incurred by the prior art servo system in enabling write operations would be equal to the time elapsed between time $t_1$ and time $t_4$ which is approximately equal to 400 μsec.

An additional problem in prior art disk drives is that during the settling period, the head may settle to positions within the error margin for a period and then abruptly move to a position outside of the error margin. In the depicted example, the PES value 12 sampled at time $t_{16}$ is outside of the negative error limit 22. However, in accordance with the prior art method of inhibiting write operations, the write operations enabled at time $t_4$ are still enabled at time $t_{16}$, and therefore a higher TMR occurs if the head writes at time $t_{16}$ because the head is beyond the desired limit.

What is needed is a process of enabling write operations during a head settling period following an actuator seek operation in a disk drive, the process providing minimal delay in enabling write operations while protecting against track misregistration due to incomplete head settling.

SUMMARY OF THE INVENTION

It is an object of the present invention to provide a process of enabling write operations during a head settling period following an actuator seek operation in a disk drive, the process providing minimal delay in enabling write operations while protecting against track misregistration due to incomplete head settling.

Briefly, a presently preferred embodiment of the present invention includes a disk drive system having: a disk having position information stored in a plurality of tracks formed on the disk; an actuator assembly responsive to an actuator command signal and operative to position a read/write head relative to the tracks of the disk, the head being operative to read the position information in order to generate a position signal; a position channel unit responsive to the head signal and operative to generate a position error signal; a servo controller responsive to the position error signal and operative to determine position values indicative of the position of the head during each of a plurality of sampling intervals, and also being operative to provide and update the actuator command signal during the sampling intervals for controlling servo operations including a track seek for positioning the head relative to a target track.

The controller means is further operative to perform a process of inhibiting write operations for writing data to the tracks of the disk during a head settling period following a track seek. During each of a first plurality of the sampling intervals transpiring during a first time period, the servo controller determines a present position value indicative of the position of the head relative to the center of the target track during the present sampling interval, and also determines a predicted position value indicative of the position of the head relative to the center of the target track during a subsequent sampling interval. Also during each of the first plurality of sampling intervals, the servo controller determines: (1) whether or not the present position value is within a first error margin from a center value indicative of the center of the target track; and (2) whether or not the predicted position value is within the first error margin from the center value. If the present position value and the predicted position value are both within the first error margin from the center value, the servo controller enables write operations.

During each of a second plurality of the sampling intervals transpiring during a second time period, the servo controller determines a predicted position value indicative of the position of the head relative to the center of the target track during a subsequent sampling interval. Also during each of the second plurality of sampling intervals, the servo controller determines whether or not the predicted position value is within a second error margin from the center value. If the predicted position value is not within the second error margin from the center of the target track, the servo controller inhibits write operations.

An important advantage of the present invention is that write operations following a track seek operations are enabled with minimal delay following the head settling period while protecting against track misregistration due to incomplete head settling.

IN THE DRAWINGS

DETAILED DESCRIPTION OF THE PREFERRED EMBODIMENTS

Figure 1:
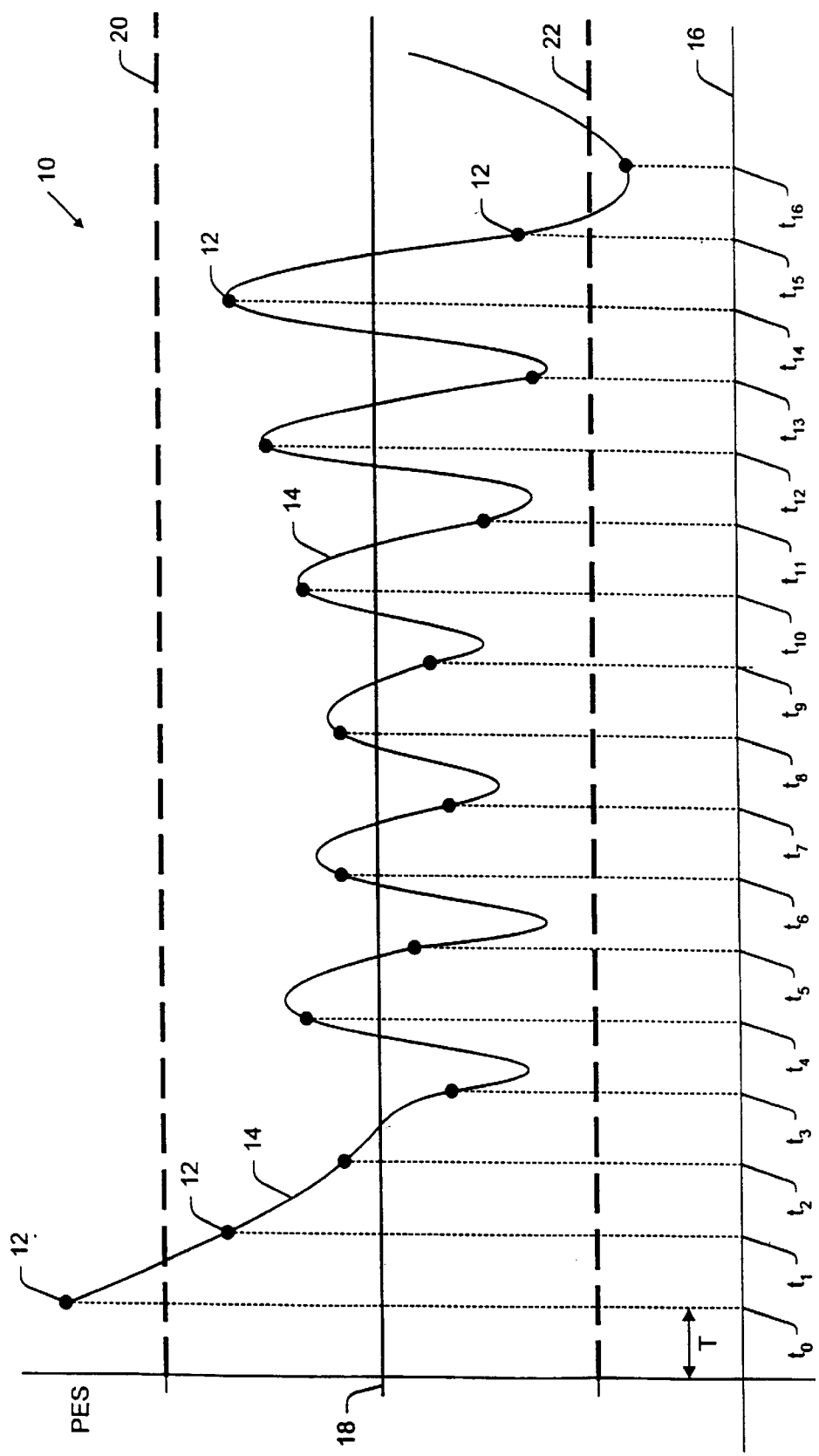
FIG. 1 is a graph illustrating exemplary sampled values of a position error sensing signal (PES signal) plotted as a function of time during a head settling period following a track seek operation, the graph including an error margin used in a prior art process of inhibiting write operations.
Figure 2:
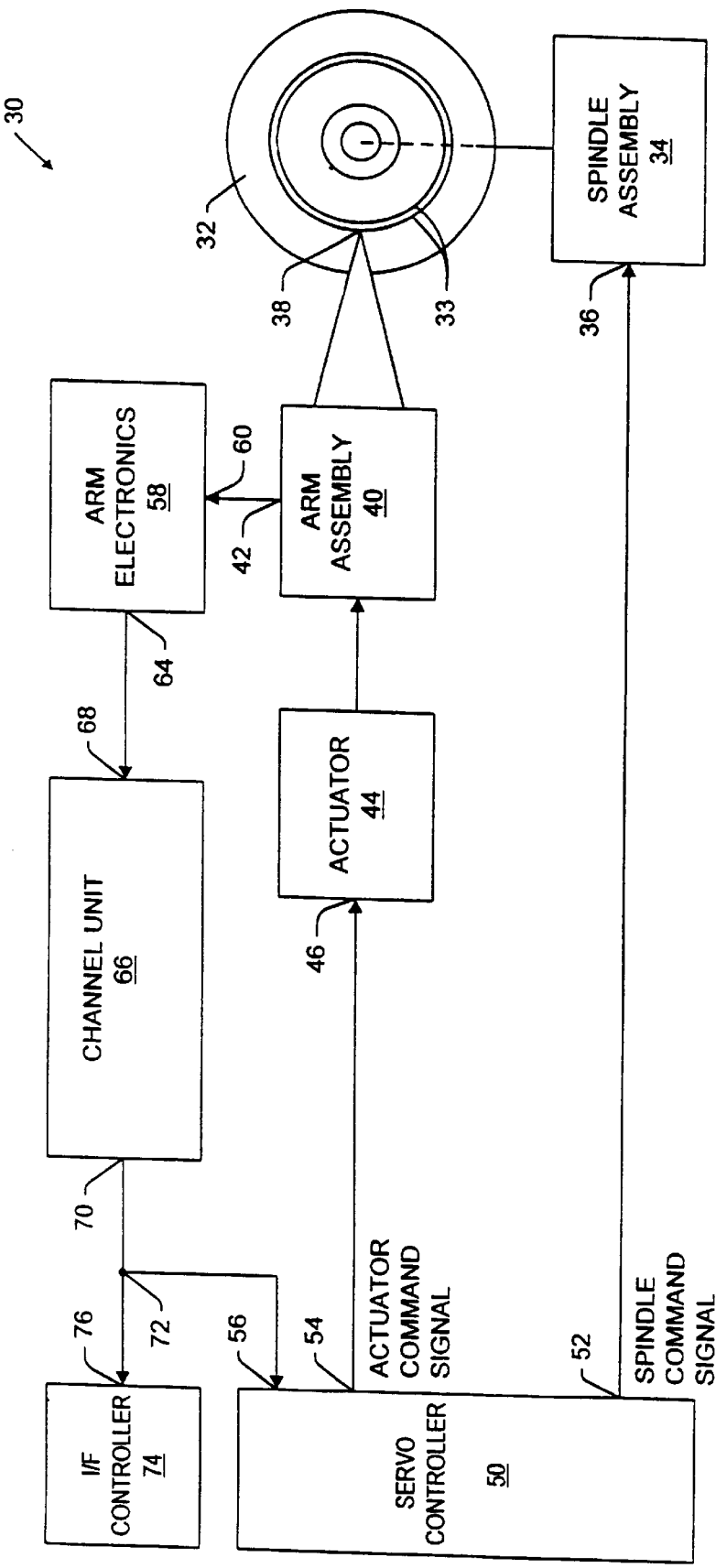
FIG. 2 is a schematic block diagram of a disk drive system which may be used to implement the present invention.

Referring now to the drawing, FIG. 2 shows a block diagram at 30 schematically showing a disk drive suitable for practicing the present invention. The disk drive 30 includes: a disk 32 having a thin magnetic coating formed thereon for storing user data and position information on a plurality or concentric tracks 33, the disk 32 being rotatably mounted to a spindle assembly 34 having a spindle motor and a spindle driver circuit, and also having an input 36 for receiving a spindle command signal used to control the rotational velocity of the disk. The disk drive 30 also includes one or more transducers or read heads 38 for reading magnetic transitions of the disk 32; a head/arm assembly 40 for supporting the read heads 38 in close proximity to the rotating disk surface, and having an output 42 providing a read-back signal carrying user data and position information provided by the head as the head reads the disk; and an actuator assembly 44, having an actuator driver circuit and an actuator motor for driving the arm assembly to control the position of the read/write head 38 in response to an actuator command signal received via an input 46. The arm assembly 40 may be a linear or rotary type assembly, and the actuator assembly 44 preferably comprises a voice coil motor.

The disk drive 30 further includes: a servo controller 50 having an output 52 providing a spindle command signal to input 36 of the spindle assembly 34, an output 54 providing an actuator command signal to input 46 of the actuator assembly 44, and an input 56; an arm electronics circuit 58 having an input 60 for receiving the read-back signal carrying user data and position information from the head 38 via output 42 of the arm assembly, and an output 64 providing a pre-amplified read-back signal; a channel unit 66, including a data channel and a position channel, and having an input 68 for receiving the pre-amplified read-back signal from output 64 of the arm electronics unit, and an output 70 for providing a position error sensing signal (PES signal) carrying position information to input 56 of the servo controller 50 via a node 72; and an interface controller 74 having a port 76 connected to output 70 of the channel unit 66.

The channel unit 66 is preferably of the PRML type and includes an automatic gain control circuit, a variable frequency oscillator circuit, and sync-byte detection circuitry. Descriptions of PRML channels are provided in commonly assigned U.S. Pat. Nos. 5,220,466 and 5,255,131.

In the preferred embodiment, the servo controller 50 is a digital controller which includes means for processing the PES signal to determine head position parameters indicative of the position, velocity, and acceleration of the head for each sampling interval. Also, the servo controller 50 includes means for predicting head position parameters for subsequent sampling periods. A description of a method of predicting head position parameters for subsequent sampling intervals in a digital servo control system is provided in commonly assigned U.S. Pat. No. 4,679,103 which is incorporated herein by reference. Also, a description of a disk file digital servo control system with coil current modeling is provided in commonly assigned U.S. Pat. No. 4,914,644 which is incorporated herein by reference.

In varying embodiments, the controller includes either a microprocessor or a digital signal processor and may further include support logic such as counters, an interrupt controller, a direct memory access controller, a serial interface controller, and other components generally known to assist microprocessor control functions. The controller is normally associated with a predetermined amount of read only type memory for storing a control program, RAM, and a reference clock. The controller directly oversees operation of the interface controller 74, the channel unit 66, and the actuator and spindle control circuitry.

The controller 50 controls the precise positioning of the head 38 during execution of track seek and track following operations by regulating the voltage of the actuator command signal provided to the actuator assembly 44. The controller 50 implements closed loop servo control which utilizes the feedback of position information carried by the PES signal received from the disk via the channel unit 66 to find and maintain a position over a target track of the disk 32. It will be apparent to those skilled in the art of disk drive technology that the position information may be located on a single dedicated disk surface (i.e., a dedicated servo) or embedded on data tracks between portions of user data (embedded servo).

Figure 3:
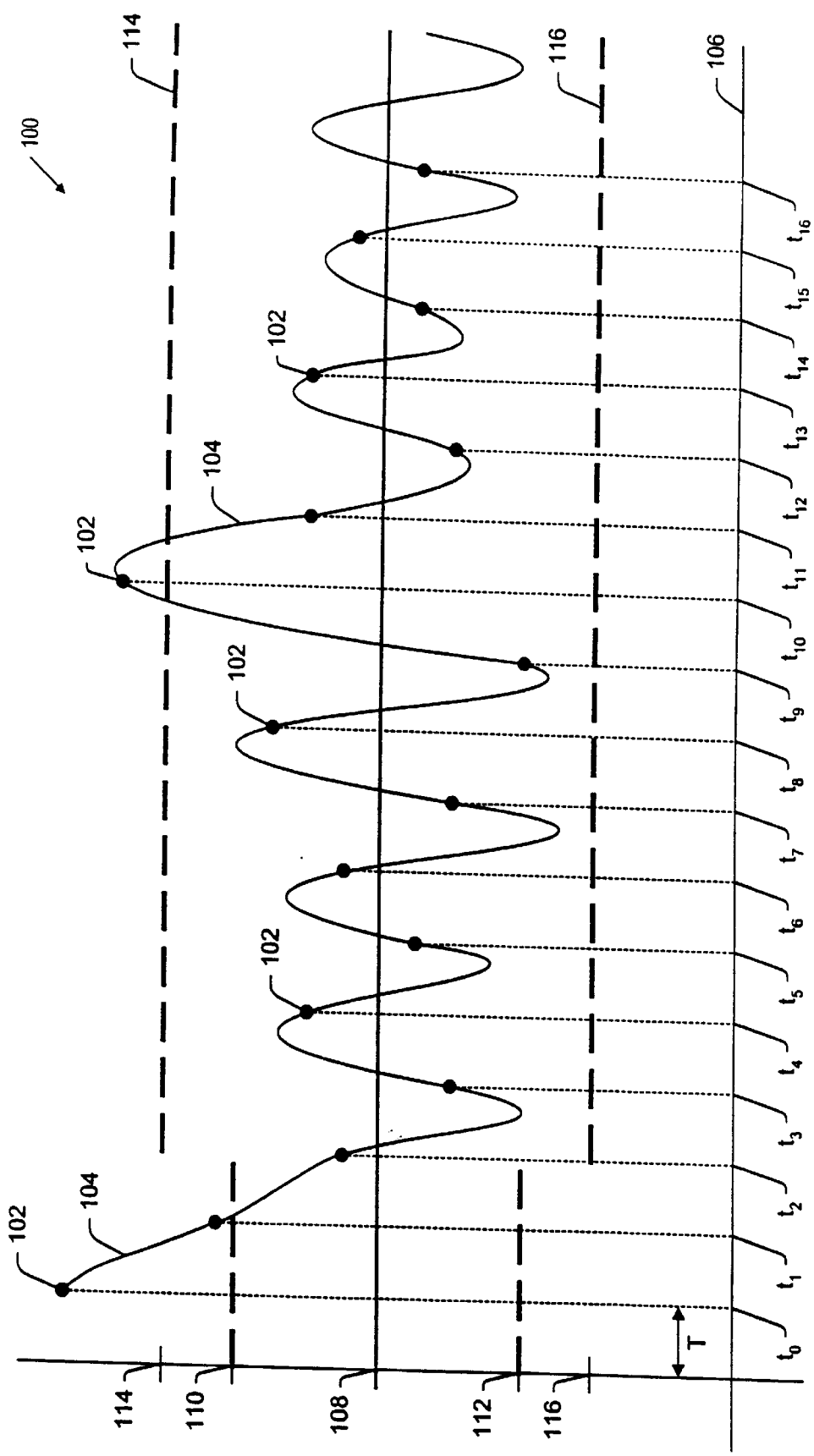
FIG. 3 is a graph illustrating exemplary sampled values of an exemplary PES signal plotted as a function of time during a head settling period following a track seek operation, the graph including first and second error margins used in a process of enabling write operations in accordance with the present invention.

FIG. 3 shows a graph at 100 illustrating sampled PES values 102 of an exemplary PES signal 104 plotted against a time axis 106 at sampling intervals, having a period T, during a head settling period following a track seek operation of the servo system 30 (FIG. 2) of the present invention. The depicted graph also includes: a center value 108 indicative of the center of a target track to which the head 38 (FIG. 2) is settling following a seek operation; a first positive error limit 110; a first negative error limit 112; a second positive error limit 114; and a second negative error limit 116. The first positive error limit 110 and first negative error limit 112 form a first error margin 110, 112. The second positive error limit 114 and second negative error limit 116 form a second error margin 114, 116. The first and second error margins are used in a process of inhibiting write operations according to the present invention as described below with respect to flow diagrams illustrated in FIGS. 4 and 5.

Figure 4:
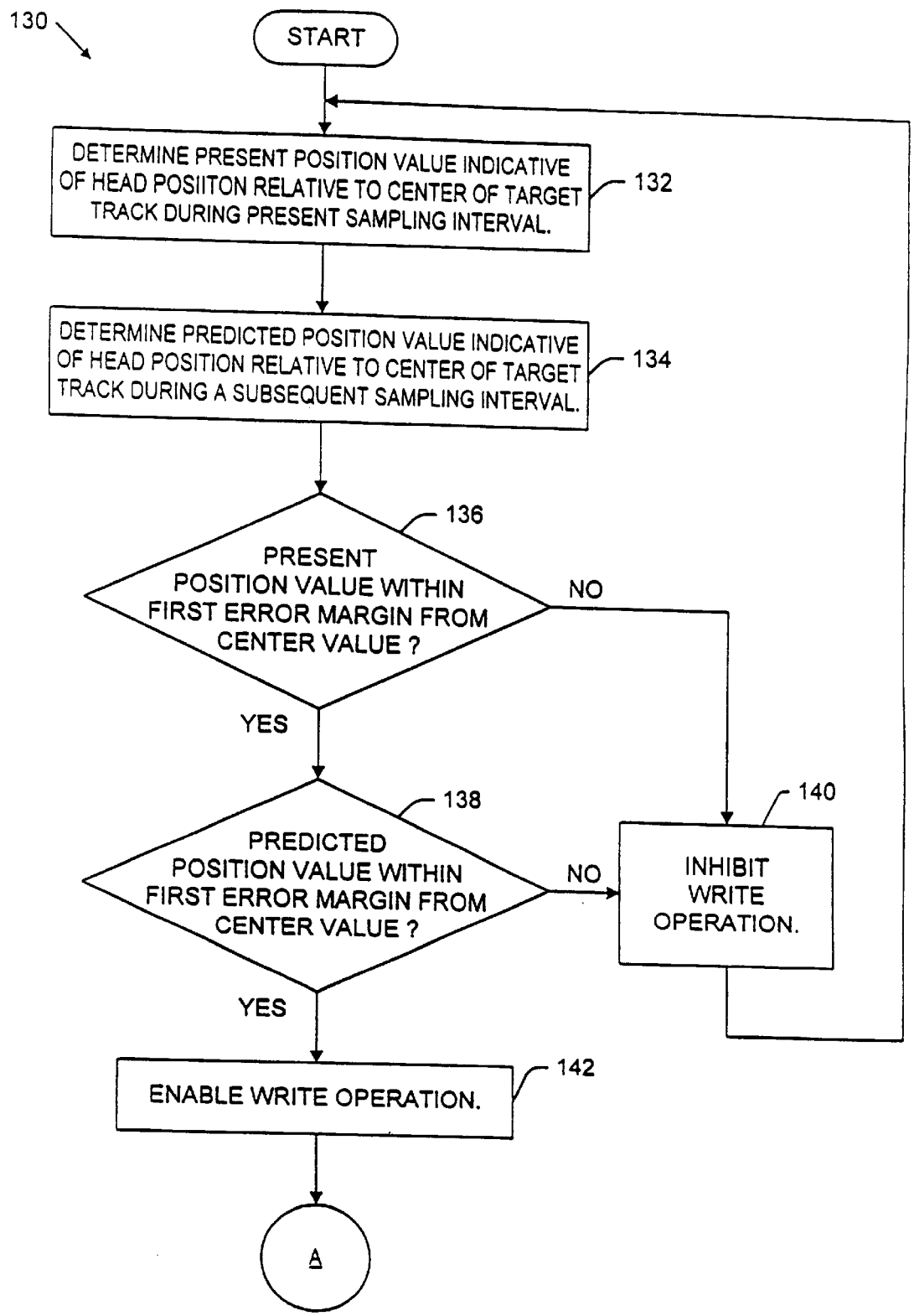
FIG. 4 is a flow chart illustrating a first sequence of the process of enabling write operations according to the present invention.

FIG. 4 shows a flow chart at 130 illustrating a first sequence of the process of inhibiting write operations according to the present invention. The depicted process begins with step 132 in which the servo controller 50 (FIG. 2) determines a present position value indicative of the position of the head 38 (FIG. 2) relative to the center of a target track during a sampling interval. For example, at time $t_1$ (FIG. 3), the servo controller determines the present PES value 102 corresponding to time $t_1$. In step 143, the servo controller determines a predicted position value indicative of the position of the head relative to the center of the target track during a subsequent sampling interval. The subsequent sampling interval may be a next sampling interval, or may be an integer number N sampling intervals following the present sampling interval. For example, at time $t_1$ (FIG. 3), the servo controller determines a predicted PES value 102 corresponding to the next sampling interval beginning at time $t_2$.

The process proceeds from 134 to 136 at which the servo controller determines whether the present position value determined in step 132 is within the first error margin 110, 112 (FIG. 3) relative to the center value 108 (FIG. 3). If it is determined at 136 that the present position value is within the first error margin, the depicted process proceeds to 138. For example, at time $t_2$ (FIG. 3), the servo controller determines that the present PES value corresponding with time $t_2$ is within the first error margin 110, 112 relative to the center value 108 (FIG. 3).

From 136, the depicted process proceeds to 138 at which the servo controller determines whether the predicted position value determined in step 134 is within the first error margin 110, 112 (FIG. 3) relative to the center value 108 (FIG. 3). If it is determined at 136 and 138 that both the present position value and predicted position value are within the first error margin from the center value, the depicted process proceeds to step 142 in which the servo controller enables a write operation. For example, at time $t_2$ (FIG. 3), the servo controller determines that the present PES value corresponding with time $t_2$ is within the first error margin 110, 112 relative to the center value 108 (FIG. 3), and that the predicted PES value associated with the next sampling interval beginning at time $t_3$ is also within the first error margin. Therefore, write operations are enabled at time $t_2$ (FIG. 3) in accordance with the process of the present invention.

If it is determined at 136 that the present position value is not within the first error margin from the center value, the depicted process proceeds to step 140 in which the servo controller inhibits writing operations in order to avoid track misregistration due to incomplete head settling. For example, at time $t_1$ (FIG. 3), the servo controller determines that the present PES value associated with time $t_1$ is not within the first error margin from the center value. Also, if it is determined at 138 that the predicted position value is not within the first error margin from the center value, the depicted process proceeds to step 140 as described above. For example, at time $t_0$ (FIG. 3), the servo controller predicts that the next PES value 102 corresponding with the next sampling interval beginning at time $t_1$ (FIG. 3) is not within the first error margin 110, 112. After executing step 142, the depicted process proceeds to "A" (to FIG. 5).

Figure 5:
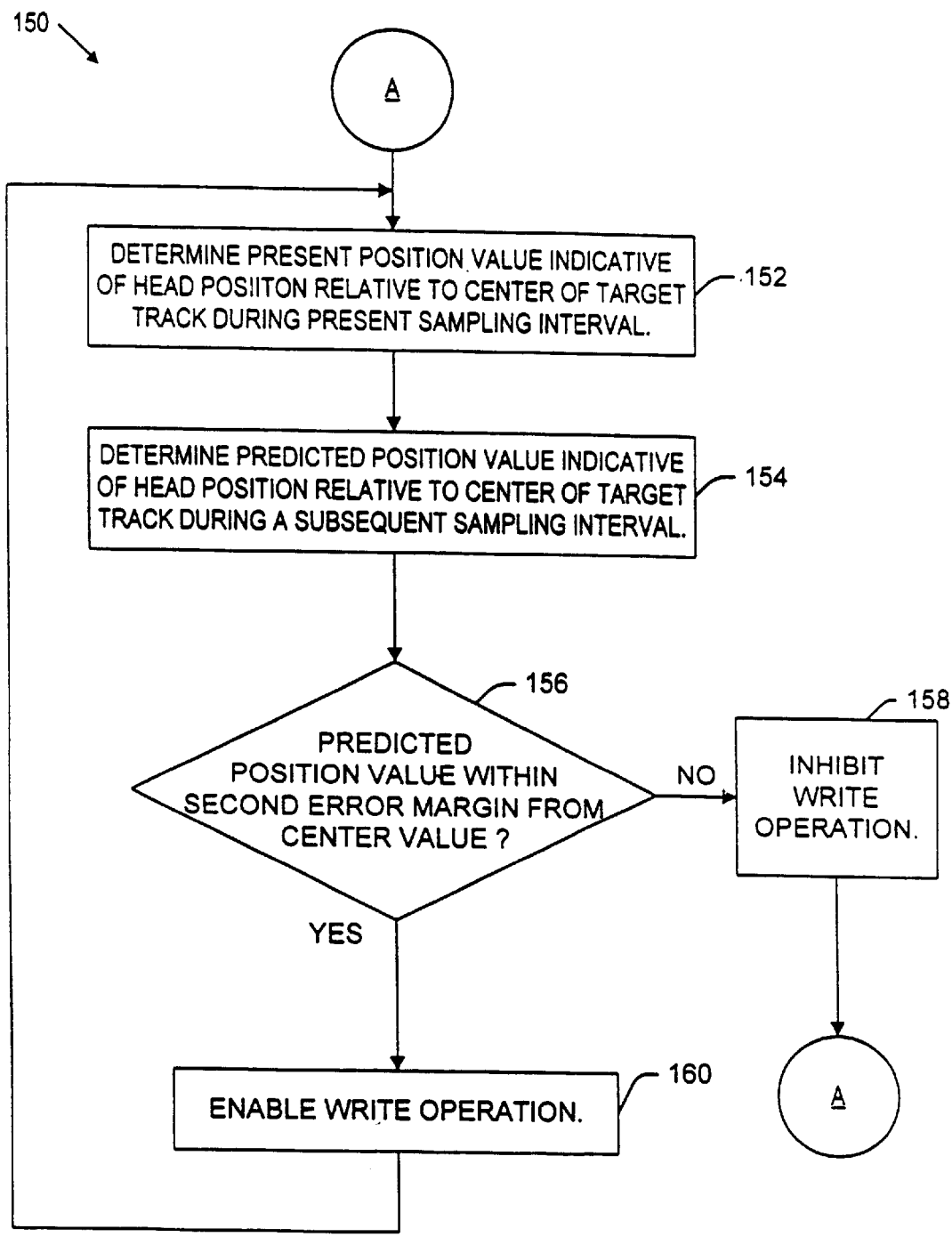
FIG. 5 is a flow chart illustrating a second sequence of the process of enabling write operations according to the present invention.

FIG. 5 shows a flow chart at 150 illustrating a second sequence of the process of inhibiting write operations according to the present invention. The depicted process steps proceed from "A" to step 152 in which the servo controller 50 (FIG. 2) determines a present position value indicative of the position of the head 38 (FIG. 2) relative to the center of a target track during a present sampling interval. In step 154, the servo controller determines a predicted position value indicative of the position of the head relative to the center of the target track during a subsequent sampling interval. The subsequent sampling interval may be a next sampling interval, or may be an integer number N sampling intervals following the present sampling interval.

It is then determined at 156 whether or not the predicted position value determined in step 154 is within the second error margin 114, 116 (FIG. 3) from the center value 108 (FIG. 3). If it is determined at 156 that the predicted position value determined in step 154 is within the second error margin from the center value, the depicted process proceeds to step 160 in which the servo controller enables writing operations, and then proceeds back to step 152.

If it is determined at 156 that the predicted position value is not within the second error margin from the center value, the depicted process proceeds to step 158 in which the servo controller inhibits writing operations, after which the process proceeds back to "A" (to FIG. 4). For example, the sampled PES values 102 sampled at times $t_3$–$t_9$ (FIG. 3) are all within the second error margin 114, 116. However, the sampled PES value sampled at time $t_{10}$ (FIG. 3) is not within the second error margin 114, 116. Therefore, at time $t_9$, the servo controller 50 (FIG. 2) determines that the predicted position value for the next sample interval beginning at time $t_{10}$ is not within the second error margin, and therefore writing operations are inhibited.

The use of predictive analysis provided in the process of the present invention allows for minimal delay in the enabling of write operations following a head settling period of a track seek operation while protecting against track misregistration due to incomplete head settling. The predictive analysis also provides for timely inhibiting of write operations upon prediction of a head position which is outside the specified margin of error.

What is claimed is:

1. A process for inhibiting write operations in a disk drive system including a disk having a plurality of tracks formed thereon, and a read/write head, said process being performed during a head settling period following a track seek operation, said process comprising the steps of:

during each of a first plurality of sampling intervals transpiring during a first time period,
determining a present position value indicative of the position of the head relative to the center of a target track during a present sampling interval,
determining a predicted position value indicative of the position of said head relative to said center of said target track during a subsequent sampling interval,
determining whether or not said present position value is within a first error margin from a center value indicative of said center of said target track,
determining whether or not said predicted position value is within said first error margin from said center value, and
if said present position value and said predicted position value are both within said first error margin from said center value, enabling the write operations.

2. A process for inhibiting write operations as recited in claim 1 further comprising the steps of:

during each of a second plurality of said sampling intervals transpiring during a second time period,
determining a predicted position value indicative of the position of said head relative to said center of said target during a subsequent sampling interval,
determining whether or not said predicted position value is within a second error margin from said center value, and
if said predicted position value is not within said second error margin from said center of said target track, inhibiting said write operations.

3. A process for inhibiting write operations as recited in claim 2 wherein said second error margin is greater than said first error margin.

4. A process for inhibiting write operations as recited in claim 2 wherein said subsequent sampling interval is a next sampling interval.

5. A machine readable storage device having stored therein encoding instructions for executing a process for inhibiting write operations in a disk drive system including a disk having a plurality of tracks formed thereon, and a read/write head, said process being performed during a head settling period following a track seek operation, said process comprising the steps of:

during each of a first plurality of sampling intervals transpiring during a first time period,
determining a present position value indicative of the position of the head relative to the center of a target track during a present sampling interval,
determining a predicted position value indicative of the position of said head relative to said center of said target track during a subsequent sampling interval,
determining whether or not said present position value is within a first error margin from a center value indicative of said center of said target track,
determining whether or not said predicted position value is within said first error margin from said center value, and
if present position value and said predicted position value are both within said first error margin from said center value, enabling the write operations.

6. A machine readable storage device as recited in claim 5 further comprising the steps of:

during each of a second plurality of said sampling intervals transpiring during a second time period,
  determining a predicted position value indicative of the position of the head relative to the center of the target track during a subsequent sampling interval,
  determining whether or not said predicted position value is within a second error margin from said center value, and
  if said predicted position value is not within said second error margin from said center of the target track, inhibiting said write operations.

7. A machine readable storage device as recited in claim 6 wherein said second error margin is greater than said first error margin.

8. A machine readable storage device as recited in claim 6 wherein said subsequent sampling interval is a next sampling interval.

9. A disk drive system comprising:
  a disk having position information stored in a plurality of tracks formed on said disk;
  actuator assembly means responsive to an actuator command signal and operative to position a read/write head relative to said tracks of said disk, said head being operative to read said position information in order to generate a position signal;
  position channel means responsive to said head signal and operative to generate a position error signal;
  controller means responsive to said position error signal and operative to determine position values indicative of the position of said head during each of a plurality of sampling intervals, and also being operative to provide and update said actuator command signal during said sampling intervals for controlling servo operations including a track seek for positioning said head relative to a target track, said controller means being further operative to perform a process of inhibiting write operations for writing data to said tracks of said disk during a head settling period following a track seek, said process of inhibiting write operations including the steps of:
    during each of a first plurality of said sampling intervals transpiring during a first time period,
      determining a present position value indicative of the position of said head relative to said center of said target track during the present sampling interval,
      determining a predicted position value indicative of the position of said head relative to said center of said target track during a subsequent sampling interval,
      determining whether or not said present position value is within a first error margin from a center value indicative of said center of said target track,
      determining whether or not said predicted position value is within said first error margin from said center value,
      if said present position value and said predicted position value are both within said first error margin from said center value, enabling said write operations.

10. A disk drive system as recited in claim 9 wherein said process of inhibiting write operations further comprises the steps of:
  during each of a second plurality of said sampling intervals transpiring during a second time period,
    determining a predicted position value indicative of the position of said head relative to said center of said target track during a subsequent sampling interval,
    determining whether or not said predicted position value is within a second error margin from said center value, and
    if said predicted position value is not within said second error margin from said center of said target track, inhibiting said write operations.

11. A disk drive system as recited in claim 10 wherein said second error margin is greater than said first error margin.

12. A disk drive system as recited in claim 10 wherein said subsequent sampling interval is a next sampling interval.

13. A disk drive system as recited in claim 9 wherein said present position value and said next position value are values derived from a position error sensing signal.

14. A disk drive system as recited in claim 9 wherein said disk drive system employs a quadrature burst technique in deriving said position error sensing signal.

15. A disk drive system comprising:
  a disk having position information stored in a plurality of tracks formed on said disk;
  actuator assembly means responsive to an actuator command signal and operative to position a read/write head relative to said tracks of said disk, said head being operative to read said position information in order to generate a position signal;
  position channel means responsive to said head signal and operative to generate a position error signal;
  controller means responsive to said position error signal and operative to determine position values indicative of the position of said head during each of a plurality of sampling intervals, and also being operative to provide and update said actuator command signal during said sampling intervals for controlling servo operations including a track seek for positioning said head relative to a target track, said controller means being further operative to perform a process of inhibiting write operations for writing data to said tracks of said disk during a head settling period following a track seek, said process of inhibiting write operations including the steps of:
    during each of a first plurality of said sampling intervals transpiring during a first time period,
      determining a present position value indicative of the position of said head relative to said center of said target track during the present sampling interval,
      determining a predicted position value indicative of the position of said head relative to said center of said target track during a subsequent sampling interval,
      determining whether or not said present position value is within a first error margin from a center value indicative of said center of said target track,
      determining whether or not said predicted position value is within said first error margin from said center value,
      if said present position value and said predicted position value are both within said first error margin from said center value, enabling said write operations; and
    during each of a second plurality of said sampling intervals transpiring during a second time period,
      determining a predicted position value indicative of the position of said head relative to said center of said target track during a subsequent sampling interval, determining whether or not said predicted position value is within a second error margin from said center value, and if said predicted position value is not within said second error margin from said center of said target track, inhibiting said write operations.

16. A disk drive system as recited in claim 15 wherein said second error margin is greater than said first error margin.

17. A disk drive system as recited in claim 15 wherein said subsequent sampling interval is a next sampling interval.

18. A disk drive system as recited in claim 15 wherein said present position value is derived from a position error sensing signal.

19. A disk drive system as recited in claim 15 wherein said disk drive system employs a quadrature burst technique in deriving said PES signal.

* * * * *